US008923648B2

(12) United States Patent
Kurpinski et al.

(10) Patent No.: US 8,923,648 B2
(45) Date of Patent: Dec. 30, 2014

(54) WEIGHTED AVERAGE IMAGE BLENDING BASED ON RELATIVE PIXEL POSITION

(75) Inventors: Christopher M. Kurpinski, Berkley, MI (US); Tanemichi Chiba, Novi, MI (US); Justin McBride, West Boomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 807 days.

(21) Appl. No.: 12/009,588

(22) Filed: Jan. 21, 2008

(65) Prior Publication Data
US 2009/0185720 A1 Jul. 23, 2009

(51) Int. Cl.
*G06K 9/36* (2006.01)
*G06T 3/40* (2006.01)

(52) U.S. Cl.
CPC .................................. *G06T 3/4038* (2013.10)
USPC ............ 382/284; 382/294; 348/584; 345/629

(58) Field of Classification Search
USPC ........................... 382/284, 294, 300; 348/584
See application file for complete search history.

(56) References Cited

U.S. PATENT DOCUMENTS

| 6,222,937 | B1 * | 4/2001 | Cohen et al. | 382/154 |
|---|---|---|---|---|
| 6,249,616 | B1 * | 6/2001 | Hashimoto | 382/284 |
| 6,385,349 | B1 * | 5/2002 | Teo | 382/284 |
| 6,507,665 | B1 * | 1/2003 | Cahill et al. | 382/284 |
| 6,885,776 | B2 * | 4/2005 | Takakura et al. | 382/284 |
| 6,928,194 | B2 * | 8/2005 | Mai et al. | 382/284 |
| 7,161,616 | B1 | 1/2007 | Okamoto et al. | |
| 7,292,207 | B1 * | 11/2007 | Naegle et al. | 345/589 |
| 2001/0022858 | A1 * | 9/2001 | Komiya et al. | 382/284 |
| 2003/0103683 | A1 * | 6/2003 | Horie | 382/284 |
| 2003/0138167 | A1 * | 7/2003 | Rasmusen | 382/284 |
| 2004/0100443 | A1 * | 5/2004 | Mandelbaum et al. | 345/158 |
| 2004/0184638 | A1 * | 9/2004 | Nobori et al. | 382/104 |

FOREIGN PATENT DOCUMENTS

| JP | 2007-274377 | 10/2007 |
|---|---|---|
| WO | WO 2004/032063 | 4/2004 |

OTHER PUBLICATIONS

European Search Report (App. No. EP 08020900) completed May 15, 2009.
Gao, Yinghui et al.; "A stitching algorithm of remote sensing images from aviation swaying camera," International Conference on Space Information Technology; Proceedings of SPIE, vol. 5985 (Oct. 2005).
Jiang, Nan et al.; "Real-Time Video Mosaicking Robust to Dynamic Scenes," Airborne Intelligence, Surveillance, Reconnaissance (ISR) Systems and Applications III, Proceedings of SPIE, vol. 6209 (May 2006).
Luo, Ren C. et al.; "Multisensor Fusion and Integration: Approaches, Applications, and Future Research Directions," IEEE Sensors Journal, vol. 2:2 (Apr. 2002).

(Continued)

*Primary Examiner* — Eric Rush
(74) *Attorney, Agent, or Firm* — Harness, Dickey & Pierce, P.L.C.

(57) ABSTRACT

A method of processing image data is provided. The method includes determining an overlap area based on image data from a first image sensor and image data from a second image sensor; computing a first weight and a second weight based on a relative position of the image data in the overlap area; and generating a final image by blending the image data from the first image sensor and the second image sensor based on the first weight and the second weight.

20 Claims, 5 Drawing Sheets

(56) References Cited

OTHER PUBLICATIONS

Song, Ran et al.; "Fast Mosaic of High-Resolution Multiple-View Images of Surfaces from Architectural and Heritage Structures," International Conference on Automation and Logistics, Proceedings of the IEEE (Aug. 2007).

Office Action dted Jul. 24, 2012 in corresponding Japanese Application No. 2008-326081 with English translation.

* cited by examiner

WEIGHTED AVERAGE IMAGE BLENDING BASED ON RELATIVE PIXEL POSITION

FIELD

The present disclosure relates to methods and systems for image processing.

BACKGROUND

The statements in this section merely provide background information related to the present disclosure and may not constitute prior art.

It is common for surveillance systems such as, for example, security systems or navigation systems, to include multiple cameras that survey an area from different angles. The image data from the cameras is then combined and displayed as a single image. When image data from two or more cameras is combined, the resulting image can be difficult to understand, especially in the case where the image contains moving objects. For example, blind spots can exist where the object is not seen by one camera, and is only partially seen by the other camera. Additionally, if a moving object transitions from a single camera area to an area where both cameras are viewing, a dead spot may be displayed where the object disappears.

To compensate for these issues, conventional methods, for example, combine the images from both cameras by assigning a weight of 50% to each image and then displaying the combined image. However, this method results in strong visual artifacts which make the output difficult to understand. In addition, the object appears to "jump" or change angle unexpectedly as one camera loses sight of the object and the other camera picks it up.

SUMMARY

Accordingly, a method of processing image data is provided. The method includes determining an overlap area based on image data from a first image sensor and image data from a second image sensor; computing a first weight and a second weight based on a relative position of the image data in the overlap area; and generating a final image by blending the image data from the first image sensor and the second image sensor based on the first weight and the second weight.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
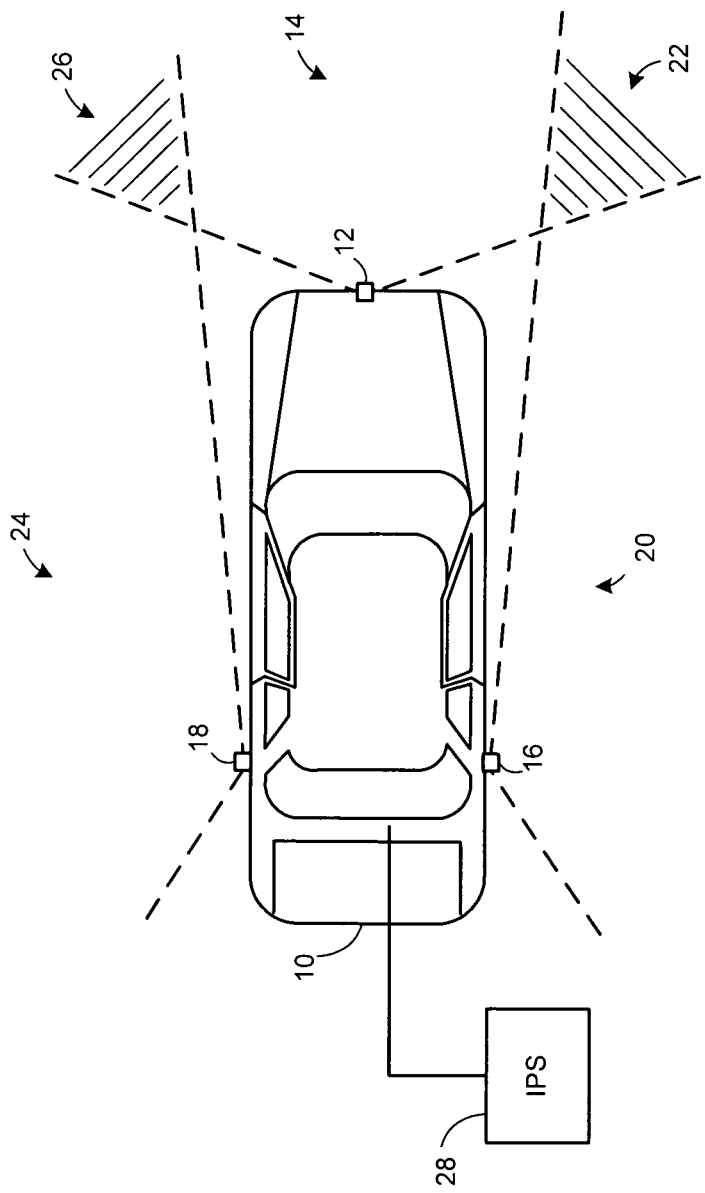
FIG. 1 is a top-view of a vehicle including an image processing system according to various aspects of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

As can be appreciated, the image processing systems of the present disclosure can be applicable to any surveillance system that includes multiple image sensors. For exemplary purposes, the disclosure will be discussed in the context of a vehicle that includes at least two image sensors.

Referring now to FIG. 1, FIG. 1 illustrates a vehicle 10 that includes multiple image sensors. For example, a first image sensor 12 is located at or near a rear end of the vehicle 10. The first image sensor 12 generates sensor image data by scanning a first area 14 behind the vehicle 10. A second image sensor 16 and/or a third image sensor 18 are located at or near a left side and/or a right side of the vehicle 10, respectively. The second image sensor 16 generates sensor image data by scanning a second area 20 spanning the left side of the vehicle 10. The second area 20 includes an overlap 22 of the first area 14. The third image sensor 18 generates sensor image data by scanning a third area 24 spanning the right side of the vehicle 10. The second area 20 includes an overlap 26 of the first area 14.

Figure 2:
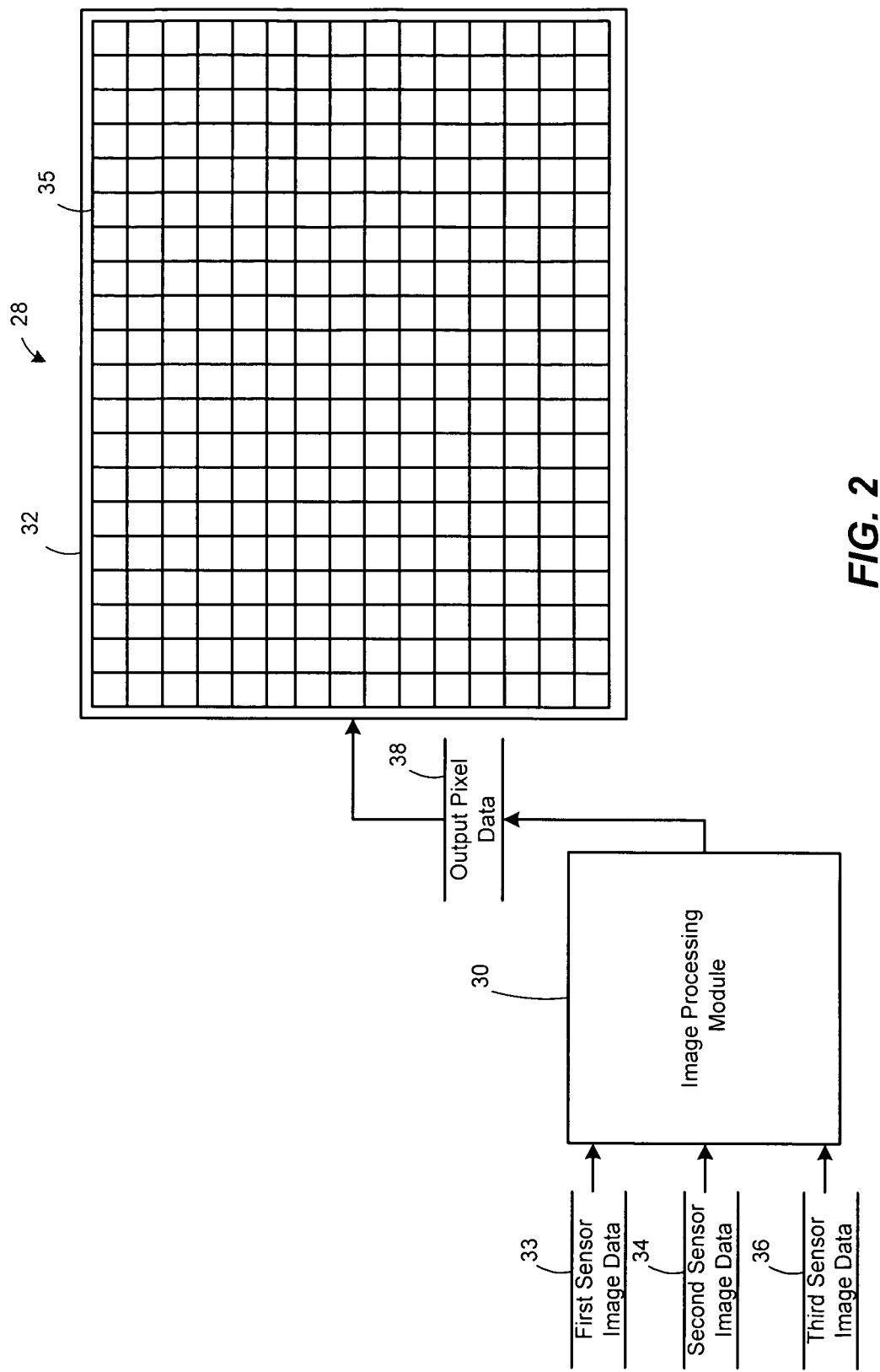
FIG. 2 is a functional block diagram illustrating the image processing system of FIG. 1 according to various aspects of the present disclosure.

An image processing system (IPS) 28 processes the sensor image data from the first image sensor 12, the second image sensor 16, and/or the third image sensor 18 to generate an overall image of the vehicle surroundings for display. As shown in FIG. 2, the image processing system includes an image processing module 30 that receives first sensor image data 33, second sensor image data 34, and/or third sensor image data 36. The image processing module 30 blends the first sensor image data 33 with the second sensor image data 34 and/or the third sensor image data 36 at the overlaps 22 and/or 26 according to an image blending method described herein. Based on the blending methods, output pixel data 38 is generated that depicts a final, blended image. The final, blended image is displayed by the display 32. The display includes a plurality of pixels 35. The output pixel data 38 maps to the plurality of pixels 35.

Figure 3:
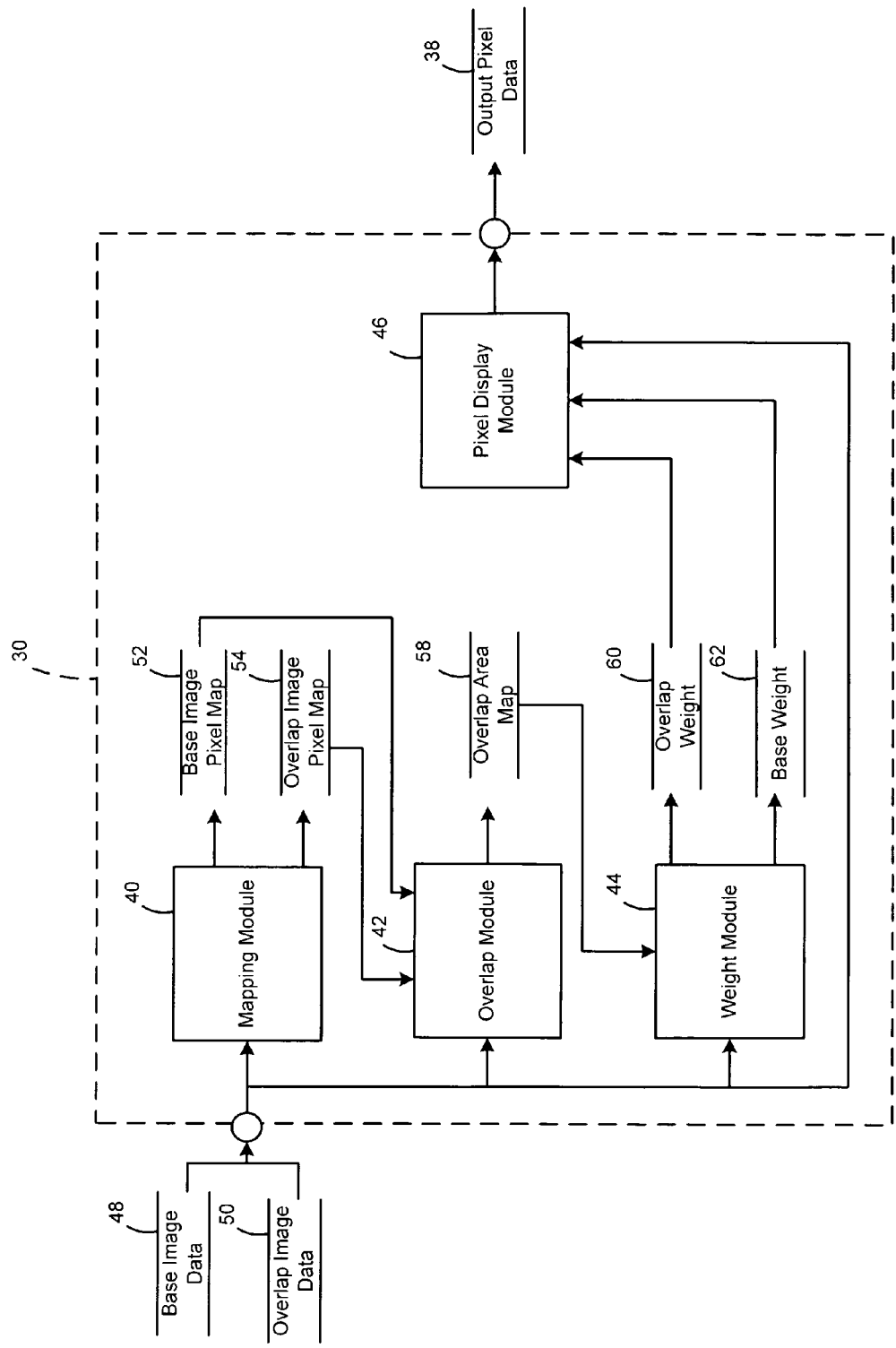
FIG. 3 is a dataflow diagram illustrating the image processing module of the image processing system of FIG. 2 according to various aspects of the present disclosure.

Referring now to FIG. 3, FIG. 3 includes a dataflow diagram that illustrates various embodiments of the image processing module 30. Various embodiments of the image processing system 28 according to the present disclosure may include any number of sub-modules embedded within the image processing module 30. As can be appreciated, the sub-modules shown may be combined and/or further partitioned to similarly process the image data. In various embodiments, the image processing module of FIG. 3 includes a mapping module 40, an overlap module 42, a weight module 44, and a display module 46.

In one embodiment, the image processing module 30 processes the image data pixel by pixel. In other embodiments, the image processing module 30 processes the image data frame by frame. In yet other embodiments, the image processing module 30 processes the image data according to a combination of pixel by pixel and frame by frame. For exemplary purposes, the image processing module 30 of FIG. 3 will be discussed in the context of processing the image data frame by frame.

As shown in FIG. 3, the mapping module 40 receives as input the image data. In one example, the first sensor image data 33 is designated as base image data 48 and the second sensor image data 34 is designated as overlap image data 50. As can be appreciated, the mapping module can similarly designate the third sensor image data 36 as the overlap image data 50 or as additional overlap image data (not shown). For ease of the discussion, the remainder of the disclosure will be discussed in the context of the image processing module 30 processing only the first sensor image data 33 and the second image sensor data 34.

The mapping module 30 generates a base image pixel map 52 and an overlap image pixel map 54. The pixel maps 52 and 54 associate the image data with the pixels 35 (FIG. 2) of the display 32 (FIG. 2).

Figure 4:
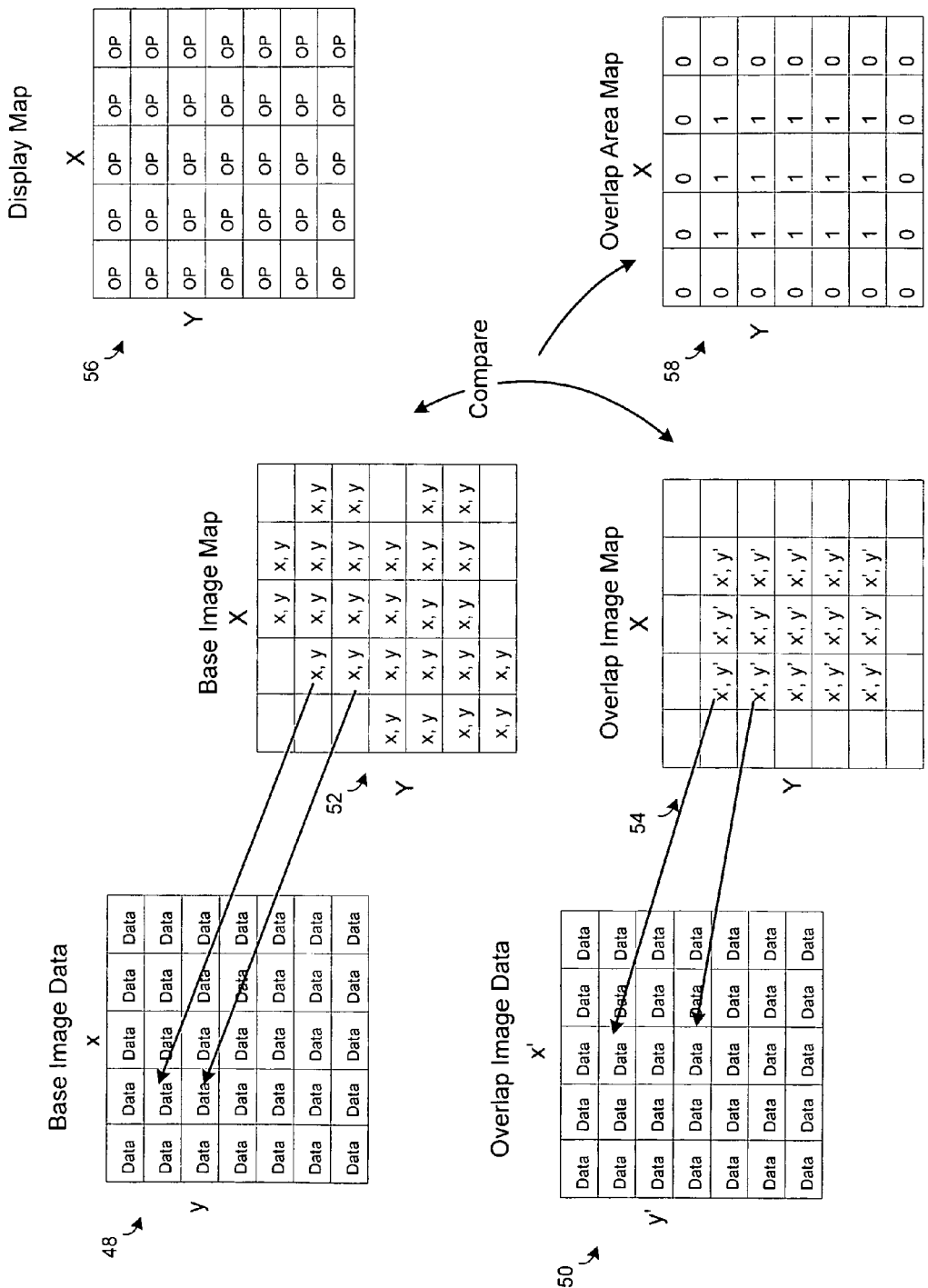
FIG. 4 illustrates data that is processed by the image processing module of FIG. 3 according to various aspects of the present disclosure.

In one example, as shown in FIG. 4, each pixel 35 (FIG. 2) of the display 32 (FIG. 2) is defined by an X,Y coordinate of a display map 56. The base image pixel map 52 is defined by the plurality of X,Y coordinates of the display map 56. Each X,Y coordinate of the base image pixel map 52 stores a pointer to or an x,y coordinate of a corresponding location of the base image data 48. Similarly, the overlap image pixel map 54 is defined by the same plurality of X,Y coordinates of the display map 56. Each X,Y coordinate of the overlap image pixel map 54 stores a pointer to or an x',y' coordinate of a corresponding location of the overlap image data 50.

Referring back to FIG. 3, the overlap module 42 receives as input the base image pixel map 52 and the overlap image pixel map 54. The overlap module 42 processes the two maps 52 and 54 to determine an overlap area map 58.

In one example, as shown in FIG. 4, an overlap area map 58 is generated by traversing the X,Y coordinates of the base image pixel map 52 and the X,Y coordinates of the overlap image pixel map 54, retrieving the corresponding image data based on the x,y or x',y' coordinates or pointers, and evaluating the image data. If image data exists at both the x,y location of the base image data 48 and the x',y' location of the overlap image data 50, an overlap exists and an X,Y coordinate of the overlap area map 58 is designated as an overlap area. If image data exists at only one of the corresponding xy location of the base image data 48 or the corresponding x',y' location of the overlap image data 50, no overlap exists and an X,Y coordinate of the overlap area map 58 is designated as a non-overlap area. If image data does not exist for both the corresponding x,y location of the base image data 48 and the corresponding x',y' location of the overlap image data 50, no overlap exists and an X,Y coordinate of the overlap area map 58 is designated as a non-overlap area. For example, the overlap area map 58 can be updated with ones for overlap areas and zeros for non-overlap areas.

Referring back to FIG. 3, the weight module 44 receives as input the overlap area map 58, the base image data 48, and the overlap image data 50. The weight module 44 computes an overlap weight 60 and a base weight 62 for each pixel 35 (FIG. 2) of the display 32 (FIG. 2). In one example, the weight module 44 assigns each pixel position a weight based on the pixel's relative position in the overlap area. The pixels in each image are weighted higher as they get closer to a designated position of the image sensor 12 or 16 (FIG. 1).

For example, the weight module 44 traverses the overlap area map 58. Once a first overlapping area is encountered, the X,Y location is recorded. A horizontal scale (HS) is calculated by finding a distance from a position of the first overlapping area to a maximum width (MaxW) of the total overlap area. A vertical scale (VS) is calculated by finding a distance from a position of the first overlapping area to a maximum height (MaxH) of the total overlap area. For example, the horizontal scale (HS) can be computed based on the following equation:

$$\text{HS} = \text{Max}W - \text{FirstOverlap}Xpos. \tag{1}$$

The vertical scale (VS) can be computed based on the following equation:

$$\text{VS} = \text{Max}H - \text{FirstOverlap}Ypos. \tag{2}$$

In various embodiments, the weight module 44 determines the maximum height (MaxH) and the maximum width (MaxW) when the maximum height or width of the total overlap area is not static, or not known at compile time. For example, to determine the maximum width (MaxW), a loop can 'look ahead' and test each following pixel until either the end of the row is reached, or a non-overlap area (zero) is found. To determine the maximum height (MaxH), a loop can 'look ahead' and test each following pixel until either the end of the column is reached, or a non-overlap area (zero) is found. Once the maximum height and width are found, the horizontal and vertical scales can be computed as described above.

Once the horizontal and vertical scales are determined, the weight module 44 continues to traverse the overlap area map 58. For each overlap area, the weight module 44 computes a relative position. For example, the relative position can be computed as the current position (XY coordinate) minus the first overlap position as shown as:

$$\text{relative } X \text{ position} = \text{Current}Xpos - \text{FirstOverlap}Xpos; \tag{3}$$

and $$\text{relative } Y \text{ position} = \text{Current}Ypos - \text{FirstOverlap}Ypos. \tag{4}$$

The weight module 44 then computes a horizontal weight (HW) and a vertical weight (VW). For example, the horizontal weight (HW) can be computed as the relative horizontal position divided by the horizontal scale (HS) as shown as:

$$HW = 1 - \left(\frac{\text{relative } X \text{ position}}{HS}\right). \tag{5}$$

The vertical weight (VW) can be computed as the vertical position divided by the vertical scale (VS) as shown as:

$$VW = 1 - \left(\frac{\text{relative } Y \text{ position}}{VS}\right). \tag{6}$$

In this example, the weights are computed as $$1 - \left(\frac{\text{position}}{\text{scale}}\right).$$

This is to ensure that the top leftmost area of the total overlap area is given the highest weight. In various embodiments, the computation depends on the scanning direction and placement of the image sensor 16 or 18. If the overlap image data

50 is from the right-side image sensor 18, the weights are computed as $$\left(\frac{\text{position}}{\text{scale}}\right),$$

since the top leftmost overlap area should have equal weight between the right and rear image sensors 18 and 12 (FIG. 1), respectively.

In various embodiments, the weight module 44 can limit the minimum weight of each axis. This prevents any one sensor image from disappearing from regions when the computed weight is too low. However, in this example, the weights are no longer fully linear. In various other embodiments, the weight module 44 computes the horizontal weight (HW) by changing the scale that is being used to compute the weights. For example, the weights are computed based on a desired minimum weight (DMW) as shown as:

$$HW = 1 - \left[\left(\frac{\text{relative } x \text{ position}}{\text{horizontal scale}}\right) * (1 - DMW)\right]. \tag{7}$$

For example, using 30% as the desired minimum weight, the equation is shown as:

$$HW = 1 - \left[\left(\frac{\text{relative } x \text{ position}}{\text{horizontal scale}}\right) * (0.7)\right]. \tag{8}$$

The weight module 44 then computes a total overlap weight (OW) for the area and a total base weight (BW) for the area. For example, the total overlap weight (OW) can be computed as an average of the horizontal weight (HW) and vertical weight (VW) as shown as:

$$OW = \frac{HW + VW}{2}. \tag{9}$$

The total base weight (BW) can be assigned the inverse weight as shown as:

$$BW = (1 - OW) \tag{10}$$

In various embodiments, the weight module uses other scanning directions and image sensor placements. The scale, weight, and relative position computations are adjusted so that even weight is given to any pixel which is equidistant from both image sensors. As can be appreciated, when processing image data from more than two image sensors, the weights are computed independently for each overlap image data. Some additional scaling may be needed to ensure that all weights sum to 100%.

In various embodiments, the weight module 44 can perform non-linear weight computations. For example, if an exponential weight decay is desired, each axis weight can be calculated using an exponential decay. In this case the axis weights are computed as shown as:

$$HW = (e^{-scalefactor}) * HW_{prev} + [(1 e^{-scalefactor})] * MW. \tag{11}$$

Where the scale factor determines how fast the decay occurs. A higher scale factor will increase the decay rate, and a lower scale factor will reduce the decay rate. When the first overlap area is found, the initial horizontal and vertical weights are set to one.

Once the weight module 44 computes the weights 60 and 62 for each pixel, the display module 46 receives as input the base image data (BIMdata) 48, the overlap image data (OIMdata) 50, the overlap weights (OW) 60, and the base weights (BW) 62. The display module 46 generates output pixel data (OP) 38 based on the received inputs. In one example, data for each output pixel 38 is computed based on the following equation:

$$OP = (OIMdata * OW) + (BIMdata * BW). \tag{12}$$

Figure 5:
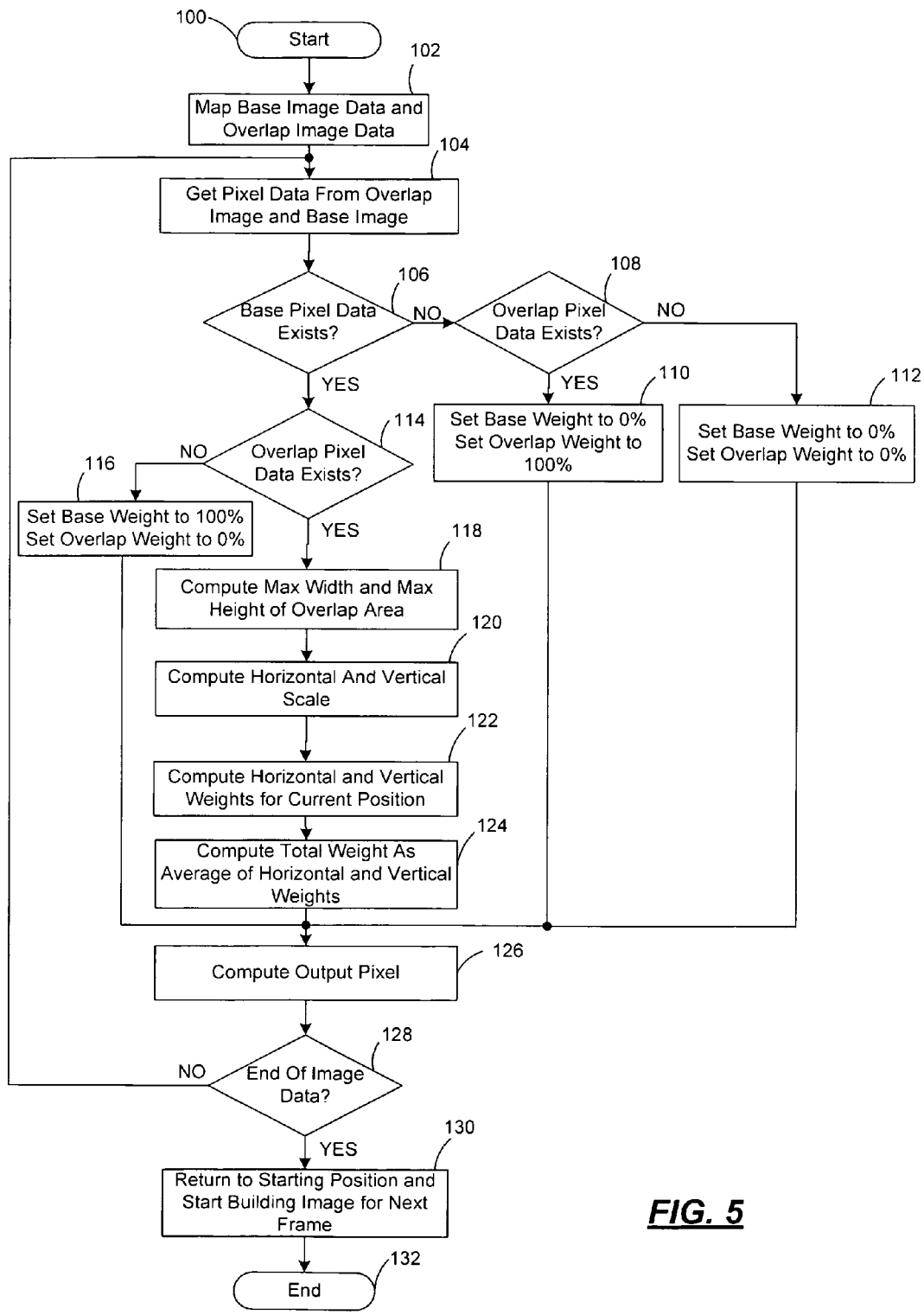
FIG. 5 is a process flow diagram illustrating an image processing method that can be performed by the image processing system of FIG. 2 according to various aspects of the present disclosure.

Referring now to FIG. 5, a process flow diagram illustrates an exemplary image processing method that can be performed by the image processing module 30 (FIG. 2) in accordance with various aspects of the present disclosure. As can be appreciated, the order of execution of the steps of the exemplary image processing method can vary without altering the spirit of the method. The exemplary method illustrates processing the image data according to a combination of pixel by pixel and frame by frame.

In one example, the method may begin at 100. The base image data and the overlap image data are mapped at 102. Based on the mapping, image pixel data from the overlap image and corresponding image pixel data from the base image are obtained at 104. The image pixel data of the base image and the overlap image are evaluated at 106, 108, and 112. If image pixel data for the base image does not exist (e.g., null value) at 106 and image pixel data for the overlap image does exist (e.g., value other than null) at 108, the overlap weight is set to 100% and the base weight is set to 0% at 110. The output pixel is computed based on the overlap weight and the base weight at 126, for example, as shown in equation 12.

If, however, image pixel data for the base image does not exist at 106 and image pixel data for the overlap image does not exist at 108, the base weight is set to 0% and the overlap weight is set to 0% at 112. The output pixel is computed based on the overlap weight and the base weight at 126, for example, as shown in equation 12.

If, however, image pixel data for the base image exists at 106 and image pixel data for the overlap image does not exist at 114, the base weight is set to 100% and the overlap weight is set to 0% at 116. The output pixel is computed based on the overlap weight and the base weight at 126, for example, as shown in equation 12.

If, however, data for the base image pixel exists and data for the overlap pixel image exists at 106 and 114, the maximum width and height of the total overlap area are determined at 118 as discussed above and the horizontal and vertical scales are computed at 120, for example, as shown in equations 1 and 2. The horizontal and vertical weights are computed at 122, for example, as shown in equations 3-6. The base weight and the overlap weight are computed at 124, for example, as shown in equations 7 and 8. The output pixel is computed at 126, for example, as shown in equation 12.

The process continues for each pixel 35 (FIG. 2) of the display 32 (FIG. 2). Once the data for each pixel of the base image and the overlap image has been processed at 128, the method may end at 130. The method then returns to the starting positions and begins to process the image data for the next frame.

In various embodiments, the exemplary method and/or systems can process the image data according to a pixel by pixel approach. In this case, none of the image maps would exist. The base image data 48 and the overlap images data 50 are both written to image buffers (not shown). Each pixel 35 of the overlap image data 50 is compared with the data of the base image buffer to determine the overlap. The weights are calculated on the spot, and the base image pixel and the overlap image pixel are combined into the resulting output pixel.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of processing first and second image data, the method comprising:
    analyzing pixels of the first image data from a first image sensor and pixels of the second image data from a second image sensor to determine a size of an overlap area of the first and second image data;
    determining a first overlap horizontal position and a maximum width of the overlap area to determine a horizontal scale of the overlap area;
    determining a first overlap vertical position and a maximum height of the overlap area to determine a vertical scale of the overlap area;
    computing a first weight and a second weight of each pixel of the first image data and each pixel of the second image data, respectively, based on a relative position of the first and second image data of each pixel in the overlap area, the first weight of each pixel of the first image always being higher as a position of each pixel gets closer to the first image sensor and the second weight of each pixel of the second image always being higher as a position of each pixel gets closer to the second image sensor; and
    generating a final image by blending the first image data from the first image sensor and the second image data from second image sensor based on the first weight and the second weight; wherein
    the computing comprises computing a horizontal weight and a vertical weight based on the relative pixel position and on a desired minimum weight greater than zero; and
    the first weight and the second weight are based on at least one of the horizontal weight and the vertical weight; wherein
    when determining the maximum width, a first loop is executed which looks ahead and tests each following pixel until one of an end of a row of pixels is reached and a non-overlap area is found; and
    when determining the maximum height, a second loop is executed which looks ahead and tests each following pixel until one of the end of a column of pixels is reached and a non-overlap area is found.

2. The method of claim 1 further comprising estimating the vertical scale and horizontal scale, and wherein the computing the horizontal weight and the vertical weight is based on at least one of the vertical scale and the horizontal scale.

3. The method of claim 2 wherein the estimating the vertical scale and the horizontal scale is based on the maximum width and the maximum height of the overlap area.

4. The method of claim 3 further comprising estimating the maximum width and maximum height of the overlap area.

5. The method of claim 1 wherein the computing comprises computing the first weight based on an average of the vertical weight and the horizontal weight.

6. The method of claim 5 wherein the computing comprises computing the second weight based on an inverse of the first weight.

7. The method of claim 1 wherein the computing the horizontal weight and the vertical weights is based on a non-linear formula.

8. The method of claim 1 further comprising mapping the image data from the first image sensor and the second image sensor to pixels of a display.

9. The method according to claim 1, wherein the overlap area includes all of the relative positions of the first and second image data having a first weight or a second weight greater than zero.

10. The method according to claim 1, wherein a pixel of the first image data overlaps with a pixel of the second image data when image data is present for both the pixel of the first image data and the pixel of the second image data, the pixel of the first image data not overlapping with the pixel of the second image data when image data does not exist in one or both of the pixels of the first image data and the pixel of the second image data.

11. Software stored on a non-transitory computer-readable medium which when executed on hardware and/or a hardware system processes image data, comprising:
    an overlap module that analyzes pixels of first image data from a first image sensor and pixels of second image data from a second image sensor to determine a size of an overlap of the first and second image data;
    a first determining module that determines a first overlap horizontal position and a maximum width of the overlap area to determine a horizontal scale of the overlap area;
    a second determining module that determines a first overlap vertical position and a maximum height of the overlap area to determine a vertical scale of the overlap area;
    a weight module that computes a first weight and a second weight of each pixel of the first image data and each pixel of the second image data, respectively, based on a relative position of the first and second image data, respectively, in the overlap area, the first weight of each pixel of the first image always being higher as a position of each pixel gets closer to the first image sensor and the second weight of each pixel of the second image always being higher as a position of each pixel gets closer to the second image sensor; and
    a display module that generates data of a final image by blending the first image data from the first image sensor and the second image data from the second image sensor based on the first weight and the second weight; wherein
    the weight module further computes a horizontal weight and a vertical weight based on the relative pixel position and on a desired minimum weight greater than zero and wherein the first weight and the second weight are based on at least one of the horizontal weight and the vertical weight;
    when determining the maximum width, a first loop is executed which looks ahead and tests each following pixel until one of an end of a row of pixels is reached and a non-overlap area is found; and
    when determining the maximum height, a second loop is executed which looks ahead and tests each following pixel until one of the end of a column of pixels is reached and a non-overlap area is found.

12. The software stored on the non-transitory computer-readable medium of claim 11 wherein the first and second determining modules estimates the vertical scale and the horizontal scale, and wherein the weight module computes the horizontal weight and the vertical weight based on at least one of the vertical scale and the horizontal scale.

13. The software stored on the non-transitory computer-readable medium of claim 12 wherein the first and second determining modules estimate the vertical scale and the horizontal scale based on the maximum width and the maximum height of the overlap area.

14. The software stored on the non-transitory computer-readable medium of claim 13 wherein the first and second determining modules estimate the maximum width and maximum height of the overlap area.

15. The software stored on the non-transitory computer-readable medium of claim 11 wherein the weight module computes the first weight based on an average of the vertical weight and the horizontal weight.

16. The software stored on the non-transitory computer-readable medium of claim 15 wherein the weight module computes the second weight as an inverse of the first weight.

17. The software stored on the non-transitory computer-readable medium of claim 11 wherein the weight module computes the horizontal weight and the vertical weights based on a non-linear formula.

18. The software stored on the non-transitory computer-readable medium of claim 11 further comprising a mapping module that maps the image data from the first image sensor and the second image sensor to pixels of a display.

19. Software stored on a non-transitory computer-readable medium which when executed on hardware and/or a hardware system processes image data, comprising:
- a mapping module that maps first image data from a first image sensor and second image data from a second image sensor to pixels of a display;
- an overlap module that analyzes pixels of the first image data from the first image sensor and pixels of the second image data from the second image sensor to determine a size of an overlap area of the first and second image data;
- a first determining module that determines a first overlap horizontal position and a maximum width of the overlap area to determine a horizontal scale of the overlap area;
- a second determining module that determines a first overlap vertical position and a maximum height of the overlap area to determine a vertical scale of the overlap area;
- a weight module that computes a horizontal weight and a vertical weight based on a relative pixel position of the first and second image data in the overlap area and on a desired minimum weight greater than zero, the horizontal weight of each pixel of the first image always being higher as a position of each pixel gets closer to the first image sensor and the vertical weight of each pixel of the second image always being higher as a position of each pixel gets closer to the second image sensor; and
- a display module that generates data of a final image by blending the first image data from the first image sensor and the second image data from the second image sensor based on the horizontal weight and the vertical weight; wherein
- when determining the maximum width, a first loop is executed which looks ahead and tests each following pixel until one of an end of a row of pixels is reached and a non-overlap area is found; and
- when determining the maximum height, a second loop is executed which looks ahead and tests each following pixel until one of the end of a column of pixels is reached and a non-overlap area is found.

20. The software stored on a non-transitory computer-readable medium of claim 19 wherein the first and second determining modules estimate the maximum width and the maximum height of the overlap area, estimates the vertical scale and the horizontal scale based on the maximum width and the maximum height of the overlap area, and computes the horizontal weight and the vertical weight based on at least one of the vertical scale and the horizontal scale.

* * * * *